March 8, 1949.  W. B. HERBERT  2,464,133
JIG NUT
Filed Feb. 19, 1947  2 Sheets-Sheet 1
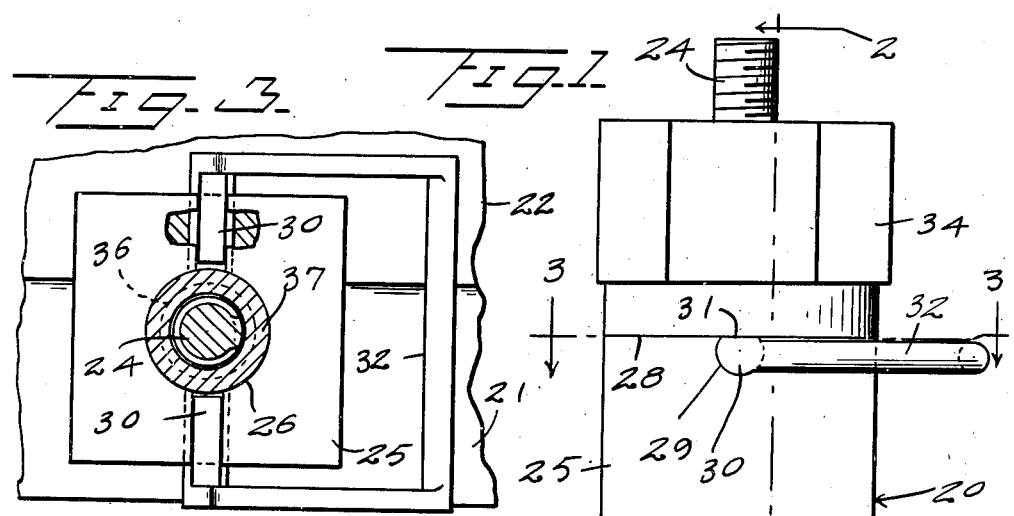
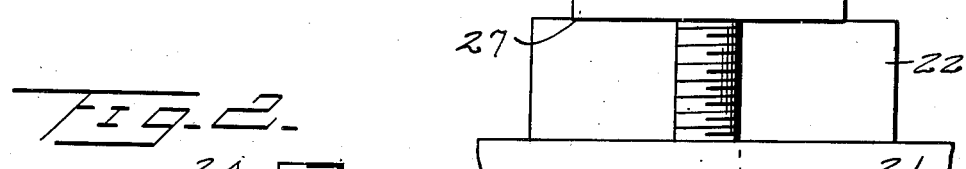
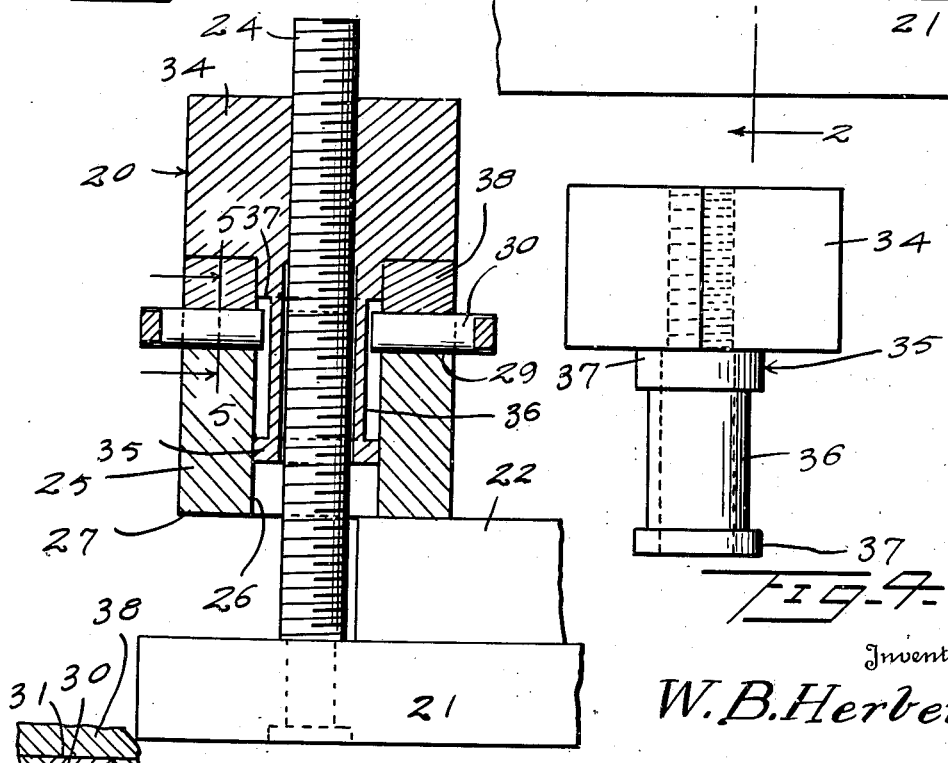
Inventor
W. B. Herbert
By Kimmel & Crowell
Attorneys March 8, 1949.    W. B. HERBERT    2,464,133
JIG NUT
Filed Feb. 19, 1947    2 Sheets—Sheet 2
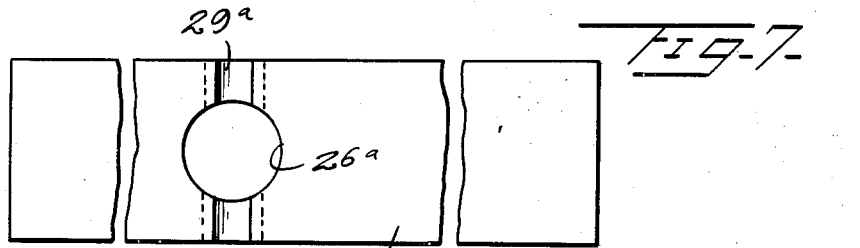
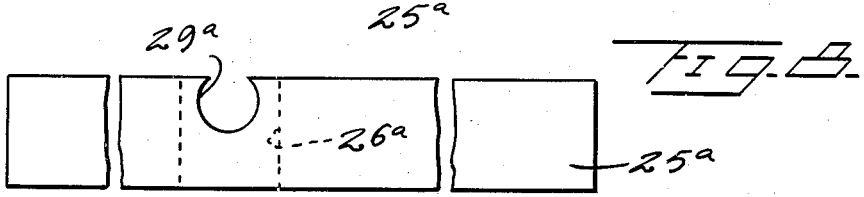
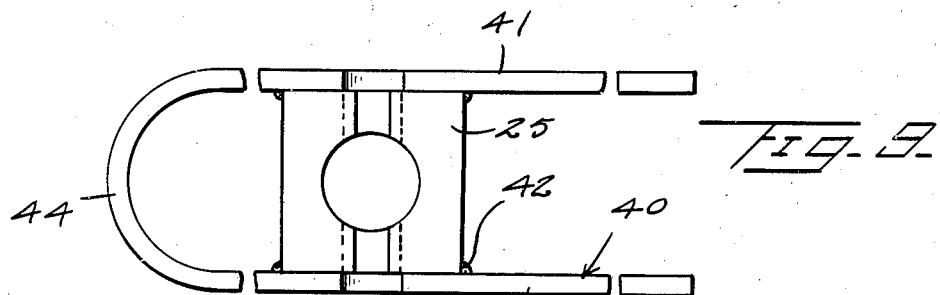
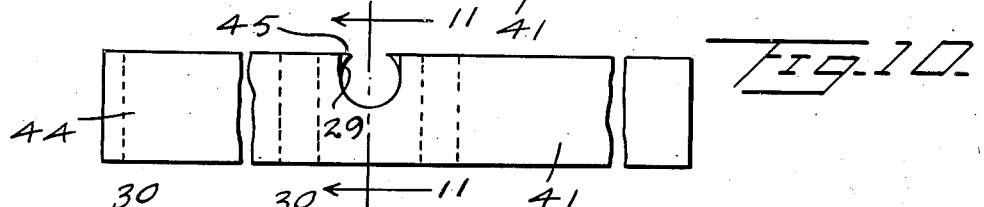
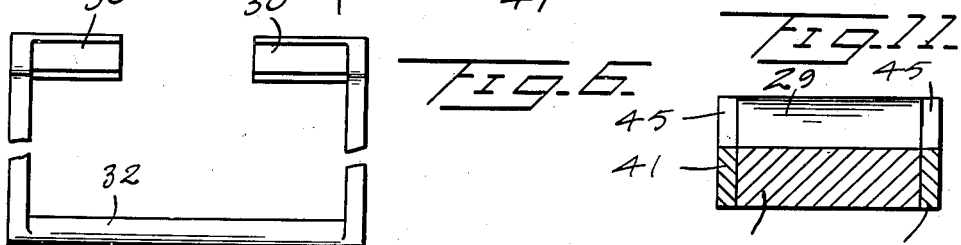
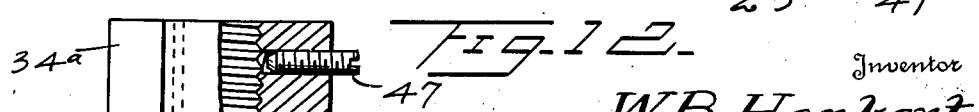
Inventor
W. B. Herbert
By Kimmel & Crowell
Attorneys Patented Mar. 8, 1949

2,464,133

UNITED STATES PATENT OFFICE 2,464,133

JIG NUT

William B. Herbert, Ridgewood, N. J.

Application February 19, 1947, Serial No. 729,501

4 Claims. (Cl. 85—32)

This invention relates to clamping devices and more particularly to a clamping nut for drill jigs or fixtures.

It is an object of this invention to provide an improved clamping nut of the kind to be more specifically described hereinafter, which will effectively clamp the work material on a jig, fixture, machine or other surface or body, without the use of wrenches or other tools with which undue forces are often obtained resulting in distortion of the work on the jig, fixture, machine, surface or body.

Another object of this invention is to provide a nut of this kind which may be adjustably secured on a jig in a selected position for successively clamping similar pieces of work on the jig to have the same operation performed on the work as required in mass production technique.

Still another object of this invention is to provide an improved clamping nut of this kind having a body and a threaded nut loosely connected together so that the separate parts will not become readily disassembled when not in use.

A further object of this invention is to provide a clamping nut of this kind having a nut engageable on a bolt fixed to the jig, and a body engageable about the bolt and loosely connected to the nut, the body abutting the lower end of the nut for clamping work material between the body and the jig.

A still further object of this invention is to provide an improved clamping nut having a nut engageable with a bolt fixed on the jig, a body loose about the bolt and engaging the lower side of the nut, rotatable cam locking members on the body for applying force between the nut and the body, and a washer or other disposable piece between the lower side of the nut and the upper side of the cams so that all the deterioration of the assembly due to continued use will be accumulated at and borne by the washer, which may be disposed of when worn beyond use and another washer readily inserted.

With the above and other objects in view, my invention consists of the arrangement, combination and details of construction disclosed in the drawings and specification, and then more particularly pointed out in the appended claims.

In the drawings,

Figure 1 is a side elevation of a clamping nut constructed according to an embodiment of this invention, Figure 2 is a vertical section taken on the line 2—2 of Figure 1, Figure 3 is a transverse section taken on the line 3—3 of Figure 1, Figure 4 is a side elevation of the nut removed from the assembly, Figure 5 is a fragmentary section taken on the line 5—5 of Figure 2, Figure 6 is a top plan view, partly broken away, of the cam members and handle removed from the assembly, Figure 7 is a top plan view, partly broken away, of a modified form of the clamping nut, Figure 8 is a side elevation of the form shown in Figure 7, Figure 9 is a top plan view of a second modified form of this invention, Figure 10 is a side elevation of the form shown in Figure 9, Figure 11 is a transverse section taken on the line 11—11 of Figure 10, Figure 12 is a modified form of nut for use in this assembly.

Referring to the drawings, the numeral 20 designates generally a clamping nut for supporting work to be drilled or otherwise machined, onto a base 21 which may be that of a jig or fixture. The nut 20 is adapted to be fixed in place on the base 21 in such a manner that the work as 22 may be clamped between the nut 20 and the base 21 by the movement of a cam carried by the clamping nut 20.

For removing the work 22 and inserting other work in the jig, it is not necessary to remove the entire nut 20 from the base 21, but it is necessary only to rotate the cams sufficiently to loosen the nut 20 on the work, whereby the work may be removed and the other work inserted which will have the same operation performed on it. This type of nut is used in mass production work where many pieces of work are required to have the same operation as drilling or other machine work.

The clamping nut 20 is adapted to be secured onto a screw or bolt 24 which is fixed at one end to the base 21. The nut 20 is formed with a body 25, having an annular opening 26 drilled or bored through the center thereof so that the bolt 24 may be very loosely engaged through the opening 26. The body 25 is formed with parallel flat upper and lower surfaces 27 and 28 respectively so that the lower surface 27 may be used for engaging the upper surface of the work 22 or a suitable clamp for clamping the work to the base 21.

The body 25 is also formed with bored openings as 29 near the upper edge 28 at right angles to the opening 26 and communicating therewith. The openings 29 are disposed on the opposite sides of the opening 26 and open at their upper edge onto the surface 28. Substantially cylindrical cam members 30 are adapted to be rotatably mounted in the openings 29 of the body 25. The cam members 30 are formed with a flat upper surface as 31 which is adapted to register and become aligned with the surface 28 of the body 25 in one position of the cams 30. The cams extend through the openings 29 at both ends thereof, the inner end of the cams extending partially into the opening 26. The outer ends of the cams 30 are connected together by a U-shaped handle 32 which is formed of rigid metal or other material for rotating the opposed cams.

The handle 32 is adapted to be in a substantially horizontal position, as shown in Figure 1, at the time when the surface 31 of the cam is in alignment with the surface 28 of the body. Rotation of the handle 32 in either direction, up or down, will effect rotation of the cams 30 so that the flat surface 31 is disposed entirely on one side of a vertical plane through the center of the openings 29 so that any force downwardly on the cam 30 will not tend to return the flat surface 31 to its original position in alignment with the surface 28.

A nut 34 is provided for threaded engagement with the bolt 24 above the body 25. The nut 34 is provided for securing the body 25 in position on the bolt for operation in securing the work 22. The nut 34 is provided with a nut extension 35 which is adapted to be slidably engaged in the opening 26 of the body 25. The nut extension 35 will stabilize the nut 34 and the body 25 as the clamping nut 20 is put under compression when work is being clamped on the jig or fixture. The nut extension 35 is substantially concentric to the nut 34, extending downward from the lower side thereof and being cylindrical in shape for sliding and rotation in the opening 26.

The nut 34 and the body 25 are loosely connected together so that they will not become separated or lost when the nut 20 is disassembled, but the nut 34 is at all times slidable and rotatable relative to the body 25.

For loosely connecting these bodies together the nut extension 35 is provided with an annular groove or recess 36 which extends substantially along the length thereof, providing shoulders or ribs 37 at each end of the nut extension. The inner end of the cam members 30 is adapted to loosely engage in the groove 36 for permitting rotation and sliding of the nut and limiting the sliding movement by engagement with the inner edges of the ribs 37 at each end of the nut extension 35.

In the use and operation of this clamping nut, the nut 20 is threaded down onto the bolt 24 until the work 22 is snugly clamped onto the base 21. The nut 34 may be threaded down onto the bolt until this snug fit is obtained and it is not desirable to apply much pressure onto the nut 34 at this time. A washer 38 is carried by the nut extension about the upper rib 37 between the lower surface of the nut 34, and the upper surface 28 of the body 25. The washer 38 is adapted to be made of suitable soft metal for absorbing the wear of the clamping nut. When the snug fit is obtained and the work 22 properly positioned on the jig, the handle 32 may be moved upwardly or downwardly to its extreme position where the flat surface 31 of the cams 30 is disposed entirely on one side of the center line of the nut 20. This movement of the handle and cams will firmly and securely lock the work 22 to the jig of fixture.

As the nut 20 is designed for repeated hard use, the washer 38 is provided as the removable element which may be disposed of when it has become deteriorated after much use. The washer 38 will be formed of a material softer than the cams 30, whereby the wear will be centered on the washer.

In Figure 7 there is shown a modified form of this invention in which the body 25a is formed with the openings 26a and 29a similar to the openings 26 and 29 above described, but the body 25a is substantially longer for greater engagement with the work or clamp for securing the material to the jig or fixture.

In Figures 9 and 10 there is shown a second modified form of this invention in which the body 25 is provided with a U-shaped frame 40 fixed on opposite sides thereof. The side arms 41 of the frame 40 are adapted to be fixed to the sides of the body 25 by welding 42 or other suitable fastening devices. The two arms 41 extend freely on one side of the body and the bight 44 connects the arms 41 on the other side of the body. The lower side of the arms 41 will provide the clamp for engaging the work and the bight 44 will provide a suitable handle for moving the clamp when the clamp is built as a portable object. The side arms 41 are each provided with a U-shaped cutout 45 which registers with the opening 29 through the body 25 to permit the free movement of the cams 30 in the bores 29.

In Figure 12 there is shown a modified form of nut 34a which is adapted for use on a more or less permanent fixture where the jig nut will require little adjustment. The nut 34a is provided with the nut extension 35a similar to the extension 35 on the nut 34 described above and a set screw 47 engages through one face of the nut 34a for fixedly securing the nut 34a onto a bolt 24.

For disassembling the clamping nut 20, the cams 30 may be moved endwise of the opening 29 to permit the nut extension 35a to be slid from the bore 26. The handle 32, while being rigid to assure simultaneous rotation of the opposed cams 30, may be sufficiently resilient along its length to permit this small movement of the cams 30.

I do not mean to confine myself to the exact details of construction herein disclosed, but claim all variations falling within the purview of the appended claims.

What I claim is:

1. A clamping nut comprising a body having parallel upper and lower surfaces, said body formed with a vertical bore therethrough, oppositely disposed substantially cylindrical cam members rotatable in said body, said cam members formed with a flat surface on one side, said flat surface being coplanar with said upper surface in one position of said members, a nut, a tubular nut extension member on the lower side of said nut, said extension member formed with an annular groove intermediate the length thereof, said tubular extension engageable in said vertical bore, and one end of said cam members loosely engageing in said groove for restraining said nut against undue sliding movement relative to said body.

2. A clamping nut as set forth in claim 1, including a washer between said nut and said cam members.

3. A clamping nut as set forth in claim 1, including a U-shaped frame fixed on said body longitudinally thereof.

4. A clamping device of the kind described comprising a body formed with a bore therethrough, a pair of cam members rotatable in said body at one end thereof on opposite sides of said bore, having portions flush with said end of the body and other portions projectable from said body in different rotated positions, a nut means engaging said one end, a tubular extension integral with the outer portion of said nut means slidably engaging in said bore, said extension formed with an annular groove intermediate the length thereof, the ends of said cam members engaging in said groove for limiting the sliding of said nut on said body.

WILLIAM B. HERBERT.

REFERENCES CITED

The following references are of record in the file of this patent:

UNITED STATES PATENTS

| Number | Name | Date |
|---|---|---|
| 1,373,645 | Bandoly | Apr. 5, 1921 |
| 1,533,688 | Bergh | Apr. 14, 1925 |
| 2,430,677 | Hobart | Nov. 11, 1947 |

FOREIGN PATENTS

| Number | Country | Date |
|---|---|---|
| 21,838 | Great Britain | 1896 |